US011108151B1

(12) United States Patent
Santhakumar et al.

(10) Patent No.: US 11,108,151 B1
(45) Date of Patent: Aug. 31, 2021

(54) DEVICE AND METHOD FOR MANAGING COMMUNICATIONS

(71) Applicant: enLighted, Inc., Sunnyvale, CA (US)

(72) Inventors: Vijaykumar Santhakumar, Dublin, CA (US); Hariharan Muthukrishnan, San Jose, CA (US)

(73) Assignee: Enlighted, Inc., Santa Clara, CA (US)

( * ) Notice: Subject to any disclaimer, the term of this patent is extended or adjusted under 35 U.S.C. 154(b) by 0 days.

(21) Appl. No.: 16/806,895

(22) Filed: Mar. 2, 2020

(51) Int. Cl.
*H01Q 1/52* (2006.01)
*H01Q 5/307* (2015.01)
*H01Q 15/14* (2006.01)

(52) U.S. Cl.
CPC ............ *H01Q 1/521* (2013.01); *H01Q 5/307* (2015.01); *H01Q 15/14* (2013.01)

(58) Field of Classification Search
CPC ......... H01Q 1/521; H01Q 5/307; H01Q 15/14
See application file for complete search history.

(56) References Cited

U.S. PATENT DOCUMENTS

| 4,753,323 | A * | 6/1988 | Kahkipuro | B66B 13/26 |
| | | | | 187/317 |
| 10,693,553 | B1 * | 6/2020 | Paulsen | H01Q 5/25 |
| 2006/0092079 | A1 * | 5/2006 | de Rochemont | H01Q 15/006 |
| | | | | 343/700 MS |
| 2006/0166628 | A1 * | 7/2006 | Anttila | H04B 1/10 |
| | | | | 455/101 |
| 2010/0289705 | A1 | 11/2010 | Shtrom et al. | |
| 2013/0278467 | A1 * | 10/2013 | Dassano | H01Q 9/0414 |
| | | | | 343/700 MS |
| 2016/0189093 | A1 * | 6/2016 | Wappler | G08B 13/2462 |
| | | | | 235/385 |
| 2016/0248169 | A1 * | 8/2016 | Mohammadian | H01Q 21/065 |
| 2016/0286169 | A1 | 9/2016 | Sannala | |
| 2018/0070364 | A1 * | 3/2018 | Varanese | H04W 72/046 |
| 2019/0334241 | A1 * | 10/2019 | Han | H01Q 9/045 |
| 2020/0186180 | A1 * | 6/2020 | Park | H01Q 1/243 |

FOREIGN PATENT DOCUMENTS

| CN | 107425289 | 12/2017 |
| EP | 3450943 | 3/2019 |

OTHER PUBLICATIONS

PCT Search Report dated May 31, 2021, for PCT Application PCT/US2021/017564, 14 pages.

* cited by examiner

*Primary Examiner* — Lam T Mai

(57) ABSTRACT

There is described a device for managing communications comprising a sensor, first and second antennas, and first and second shields. The sensor has a field of view and includes a first side and a second side, in which the second side is substantially opposite the first side. The first antenna is positioned offset from the first side of the sensor, and the second antenna is positioned offset from the second side of the sensor. The first shield is positioned adjacent to the first side of the sensor and a first distance from the first antenna, and the second shield is positioned adjacent to the second side of the sensor and a second distance from the second antenna. The first shield focuses the first antenna toward the field of view, and the second shield focuses the second antenna toward the field of view.

20 Claims, 6 Drawing Sheets

DEVICE AND METHOD FOR MANAGING COMMUNICATIONS

RELATED APPLICATIONS

This application is related to U.S. patent application Ser. No. 16/806,933, titled Device and Method for Switching Communications, by Vijaykumar Santhakumar, et al., filed on Mar. 2, 2020, and incorporated by reference in its entirety.

FIELD OF THE INVENTION

This application relates to the field of building management systems and, more particularly, to a sensor device of a building management system for managing multiple wireless communications.

BACKGROUND

Building management systems encompass a wide variety of devices that aid in the monitoring and control of various aspects of building operation. Building management systems (which may also be referred to herein as "building automation systems") include security systems, fire safety systems, lighting systems, and heating, ventilation, and air conditioning ("HVAC") systems. Lighting systems and HVAC systems are sometimes referred to as "environmental control systems" because they are capable of controlling the environmental conditions within the building.

The elements of a building management system may be dispersed throughout a facility. For example, an HVAC system includes temperature sensors and ventilation damper controls as well as other elements that are located in virtually every area of the facility. Similarly, a security system includes intrusion detection, motion sensors and alarm actuators dispersed throughout an entire building, and a fire safety system includes smoke alarms and pull stations dispersed throughout the facility. The different areas of a building management system may have different environmental settings based upon the use and personal likes of people in those areas, so the devices of a system frequently communicate with each other and proximal devices in order to determine optimal environmental settings.

The devices of a building management system are becoming technologically complex while distribution and installation of such devices needs to be as easy as possible. Many devices include multiple sensor and/or communication components that are packaged within a simple housing. The design of these devices, packing many features into a small form factor, can be challenging due to the potential interference and sensitivity of different communication technologies, each trying to maximize their performance and area of coverage.

SUMMARY

In accordance with some embodiments of the disclosure, there is provided a communication management approach for field devices of building management systems. A building management system may include field devices that integrate sensors with multiple sensors or, more particularly, a motion sensor with one or more radio frequency (RF) sensors. For example, a lighting device may include a passive infrared sensor to detect motion and RF sensors to transmit and/or receive wireless signals. Each RF sensor may utilize an antenna to optimize communication such as a Bluetooth (BLE) antenna, an IEEE 802.15.4 antenna, and/or an ultrawide band (UWB) antenna. The RF antennas may be positioned strategically about, and offset from, the sensor in order to maximize performance while integrating with the motion sensor within a small form factor. Also, a shielding may be strategically positioned at fixed lengths from each antenna to enhance the ability of the corresponding sensor to focus on an area of interest and improve its range of communication. For some embodiments, the shielding may operate in coordination with other components, such as the outer surface of the sensor or parts of the housing, to act as a Faraday-like cage or shield to enhance performance.

The circuit board of the field device, or more particularly an edge of the circuit board (as opposed to the planar surface on either side), is positioned adjacent the sensor such that the circuit board extends beyond the backend of the sensor, i.e., the end opposite the frontend. Antennas of the RF sensors are coupled to the circuit board and, likewise, both shields are grounded to the circuit board. The wireless signals communicating with the antennas are focused on the field of view in front of the sensor, i.e., the area where moving objects are expected to exist.

The building management system may include field devices that switch between different sensors or antennas, in which one sensor or antenna may be focused in a first direction and a second sensor or antenna may focus in a second direction different from the first direction. For example, a circuit of the circuit board may switch between the antennas on-the-fly based on packet error rate (PER) associated with the performance of the antennas. For some embodiments, the field device may include a third antenna in which the second antenna may operate as shielding for the third antenna, particularly when the second antenna is not radiating.

One aspect is a device for managing communications comprising a sensor, first and second antennas, and first and second shields. The sensor has a field of view and includes a first side and a second side, in which the second side is substantially opposite the first side. The first antenna is positioned offset from the first side of the sensor, and the second antenna is positioned offset from the second side of the sensor. The first shield is positioned adjacent to the first side of the sensor and a first distance from the first antenna, and the second shield is positioned adjacent to the second side of the sensor and a second distance from the second antenna. The first shield focuses the first antenna toward the field of view, and the second shield focuses the second antenna toward the field of view.

Another aspect is a device for managing communications comprising a circuit board, a sensor, first and second antennas, and first and second shields. The circuit board has a first side and a second side, in which the second side is substantially opposite the first side. The sensor is positioned adjacent to the circuit board and includes a body supported by the circuit board and a front end extending from the body. The first antenna is coupled to the first side of the circuit board and positioned proximal to the front end of the sensor offset from the first side of the circuit board. The second antenna is coupled to the second side of the circuit board and positioned proximal to the front end of the sensor offset from the second side of the circuit board. The first shield is positioned adjacent to an outer surface of the sensor and a first distance from the first antenna. The second shield is positioned adjacent to the outer surface of the sensor and a second distance from the second antenna.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
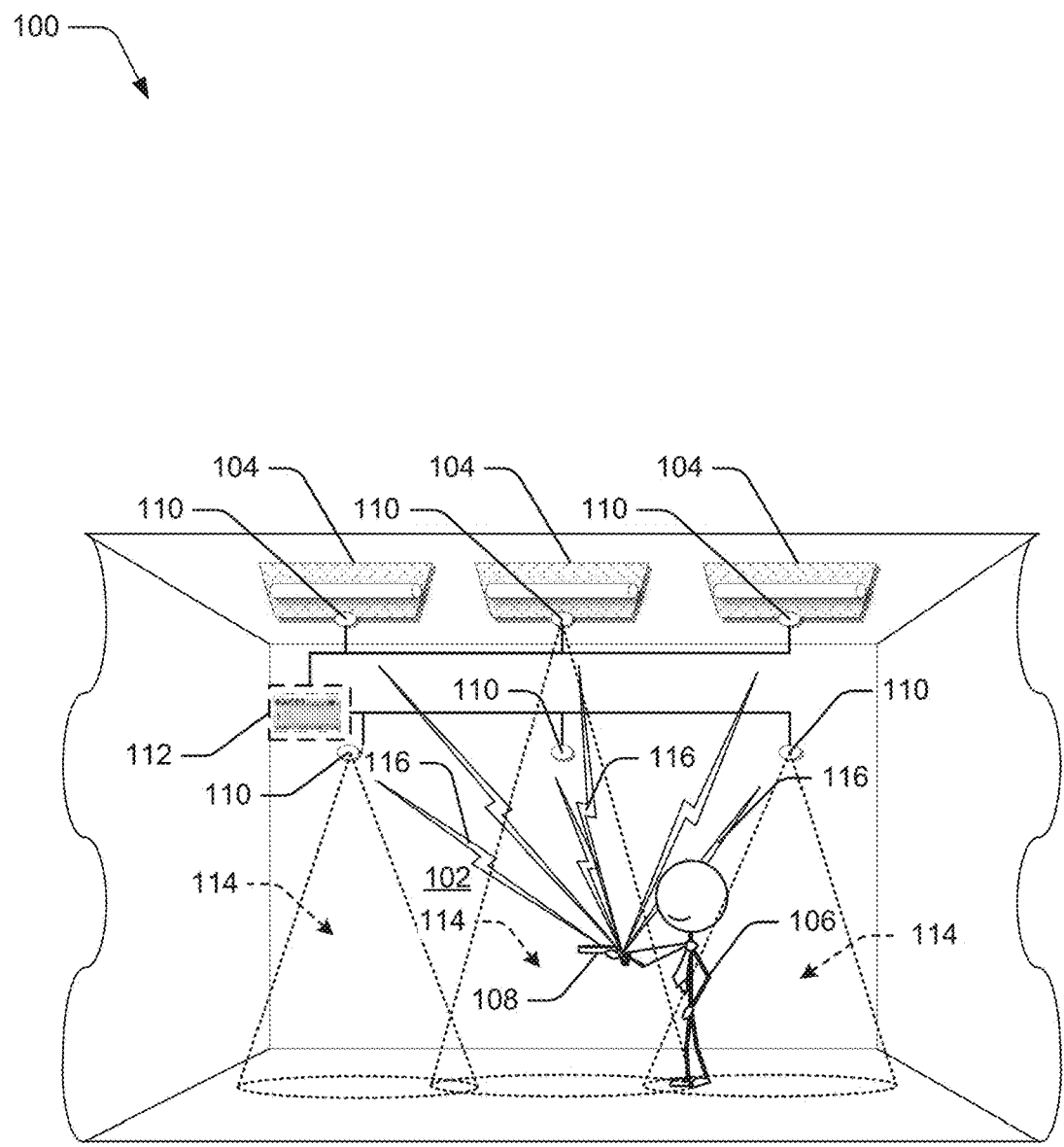
FIG. 1 is an illustration of an environment in an example implementation that is operable to employ devices and techniques described herein.

Various technologies that pertain to systems and methods that facilitate management of communications for a device of a building management system will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Referring to FIG. 1, there is shown an area 100, such as a room, that includes building structures, such as a wall 102, and/or appliances, such as light fixtures 104. The building structures and appliances may support the building management system for the detection of presence and/or movement of an occupant or asset 106. The example shown in FIG. 1 also illustrates a mobile device 108 associated with the occupant or asset 106. For example, the mobile device 108 may be carried, supported, or otherwise co-located with the occupant or asset 106 such that the location of the mobile device may be associated with the location of the occupant or asset. The building management system may include an array of field devices 110 and a controller 112 coupled via a wired or wireless link to the field devices. The array of sensors may be distributed throughout the area 100 (such as a ceiling, wall, floor, or other building structure), as well as other areas of a facility, so each sensor may be positioned at a building structure with an appliance (such as, a light fixture 104) or without an appliance (such as, at a wall 102).

Each field device 110, whether mounted to a wall 102, light fixture 104, or other structure, is configured to detect and/or track motion within a field of view 114 the area 100. An example of a motion sensor is, but is not limited to, a passive infrared sensor. Each field device 110 is also configured to communicate with one or more mobile devices 108 by radio frequency (RF) links 116. Examples of wireless technology that may be used for each RF link 116 include, but are not limited to, Bluetooth (BLE), an IEEE 802.15.4, and/or an ultrawide band (UWB) communication technology. The controller 112 represents any type of computing device, or group of devices, that may be used to receive data relating to each field device and/or room, send controls to each field device, or otherwise operate and maintain each field device. Examples of controllers 112 include, but are not limited to, a field controller, a panel, a gateway, a hub, a server, a desktop, a tablet, a mobile device, and a combination of these devices, such as a cloud or group of servers.

Figure 2A:
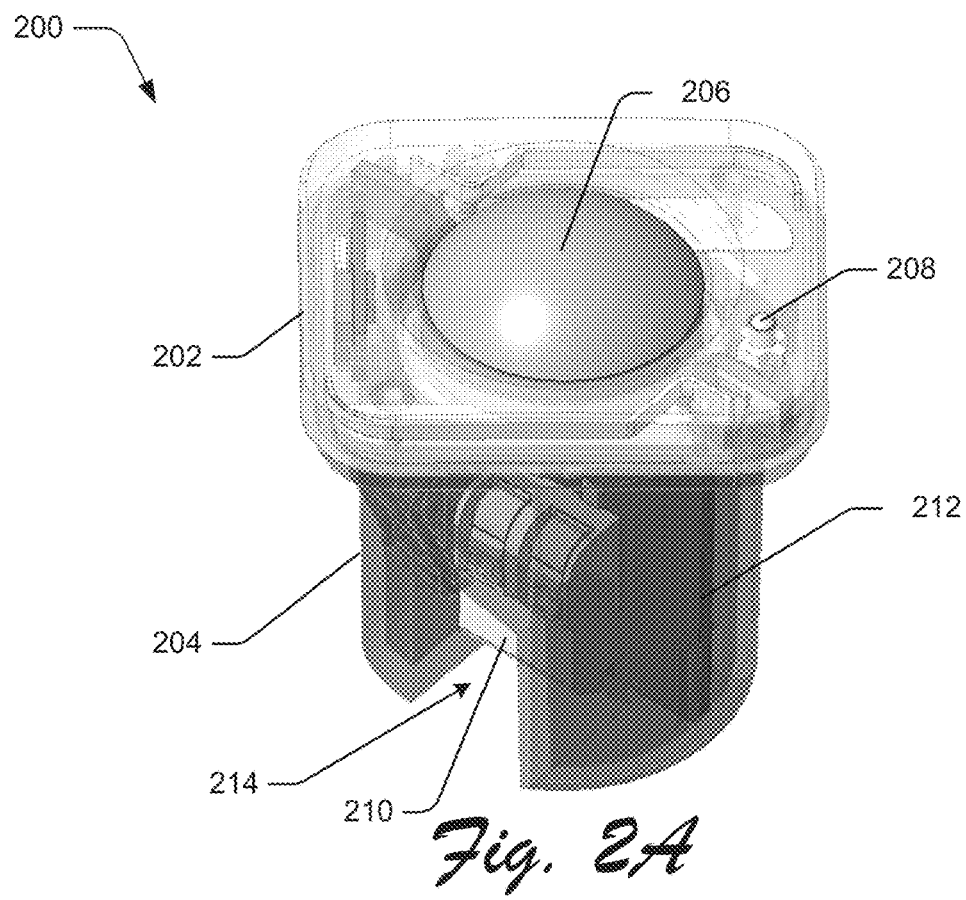
FIG. 2A is an upper perspective view of a device packaged within a translucent housing to protect device components of the device.

Referring to FIG. 2A, there is shown an upper perspective view of a device 200 packaged within a translucent housing 202, 204 to support device components 206-212 of the device. The housing 202, 204 includes a front housing 202 to support and protect a front end of the sensor and a body housing 204 to support and protect a body of the sensor. The device components 206-212 of the device 200 includes one or more exposed portions 206, 208, 210 that are exposed to an environment outside of the device as well as one or more internal portions 212 that are not exposed to the environment. As shown by example in FIG. 2, a front end of the sensor, or a portion thereof, 206 may be exposed at the front housing 202 so that the sensor may be directed to its field of view with minimal interference. Likewise, a visual indicator 208 may be exposed at the front housing 202 to maximize visibility by any occupants 106 proximal to the device 200. Further, an electrical connector 210 may be exposed at the body housing 204 to allow the sensor to be directly connected to a power source or an appliance, such as the light fixture 104. For embodiments that include the electrical connector 210, the housing 202, 204 may include a backend gap 214 to provide access to the electrical connector 210 to an external cable or connector.

Figure 2B:
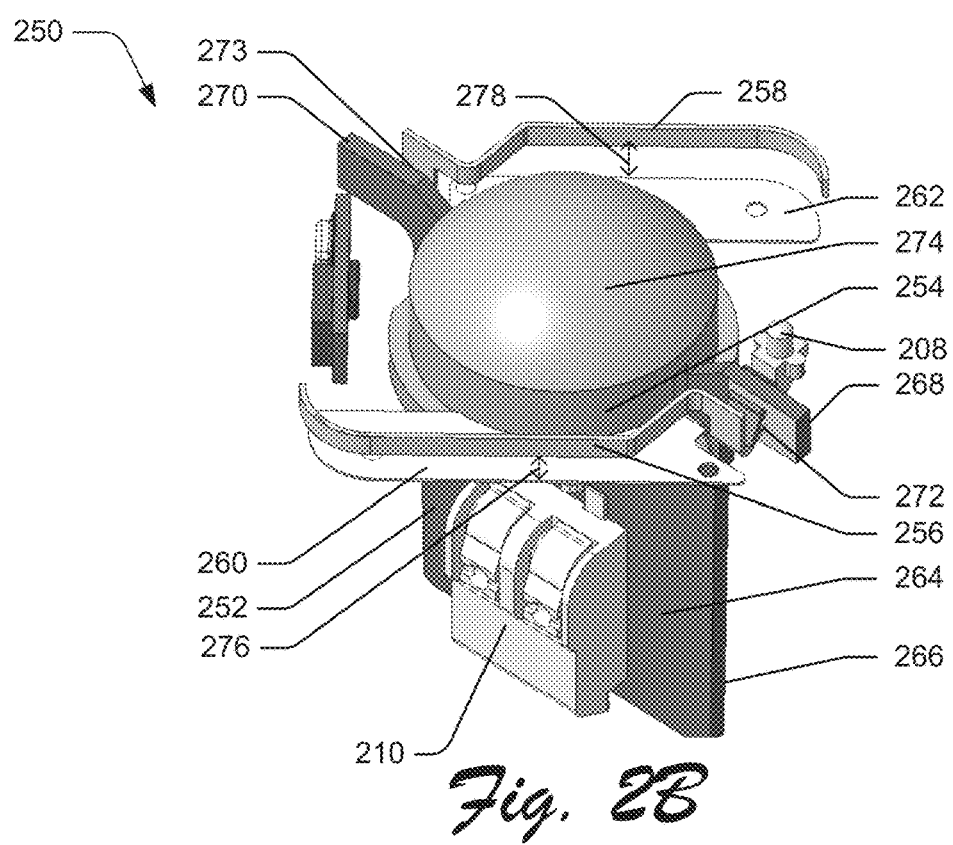
FIG. 2B is an upper perspective view of select device components of the device of FIG. 2A without the housing.

Referring to FIG. 2B, there is shown an upper perspective view of select device components of a device 250, without the housing 202, 204 shown in FIG. 2A. The device 250 includes a circuit board 252, a sensor 254, multiple antennas 256, 258, and multiple shields 260, 262. The circuit board 252 has a first side 264 and a second side 266, in which the second side is substantially opposite the first side. An upper portion of the circuit board 252 resembles a Y-shaped outline due to extensions 268, 270 at lateral side edges and as well as a cutout portion (illustrated by FIG. 4 below) at an upper central edge of the circuit board 252.

The circuit board 252, or more particularly a circuit of the circuit board, is coupled to a first frontend antenna 256 and a second frontend antenna 258. The first frontend antenna 256 may couple to a first extension 268 of the upper portion of the circuit board 252, and the second frontend antenna 258 may couple to a second extension 270 of the circuit board. For example, the first frontend antenna 256 may attach to a first soldered contact point 272 at the first extension 268, and the second frontend antenna 258 may attach to a second soldered contact point 273 at the second extension 270.

The sensor 254 of the device 250 has a field of view (represented by the field of view 114 of FIG. 1) identifiable by a focal direction of the sensor 254. An example of the sensor 254 includes, but is not limited to, a motion sensor such as a passive infrared sensor. The sensor 254 includes a front end 274 that extends from a body (or remaining portion) of the sensor 254, in which the body may be supported by the circuit board 252. By extending from the body, the front end 274 in relation to the body is directed toward the focal direction. Accordingly, the front end 274 of the sensor 254, as well as its subparts such as a sensor lens, face the field of view of the sensor 254.

Also, the sensor 254 is positioned adjacent to the circuit board 252, more particularly an upper edge of the circuit board 252, and extends laterally beyond a planar surface on either side 264, 266 of the circuit board 252. For some embodiments, the sensor 254 is mounted to the upper edge of the circuit board 252 and extends symmetrically beyond the first and second sides 264, 266 of the circuit board. The front end 274 of the sensor 254 may include a sensor lens directed away from the circuit board 252 and toward the field of view, in a direction parallel to the first and second sides 264, 266 of the circuit board 252.

The first and second frontend antennas 256, 258 are focused in a first direction, similar to the focal direction of the sensor 254, so that they are directed toward a field of view of the sensor 254. The first frontend antenna 256 may couple to the first extension 268 of the circuit board 252, and the second frontend antenna 258 may couple to the second extension 270 of the circuit board 252. The first frontend antenna 256 is coupled to the first side of the circuit board 252 and positioned proximal to the front end of the sensor 254 and, similarly, the second frontend antenna 258 is coupled to the second side of the circuit board 252 and positioned proximal to the front end of the sensor 254.

The first and second frontend antennas 256, 258 operate for different wireless technologies, even though they are focused in similar directions. Examples of wireless technologies includes, but are not limited to, Bluetooth (including BLE), Wi-Fi (including Wi-Fi Direct), Ultrawide Band, IEEE 802.15.4, Z-Wave, 6LoWPAN, Near-Field Communication, other types of electromagnetic radiation of a radio frequency wave, light-based communications (including infrared), acoustic communications, and any other type of peer-to-peer technology. For example, the first frontend antenna 256 may operate for BLE whereas the second frontend antenna 258 may operate for IEEE 802.15.4.

As stated above, the device 250 includes a first shield 260 and a second shield 262. The first and second shields 260, 262 are grounded, i.e., coupled to a ground of the circuit board 252, and the first and second shields 260, 262 direct the first and second frontend antennas 256, 258, respectively, toward the field of view of the sensor 254. The first and second shields 260, 262 are positioned adjacent to an outer surface of the sensor 254. The first shield 260 is positioned adjacent to the first side of the sensor 254 and at a first distance 276 from the first frontend antenna 256, and the second shield 262 is positioned adjacent to the second side of the sensor 254 and a second distance 278 from the second frontend antenna 258. For some embodiments, the first and second distances 276, 278 are substantially similar. For example, as illustrated in FIG. 2, the first and second shields 260, 262 may be parallel and located within a common two-dimensional plane.

Figure 3:
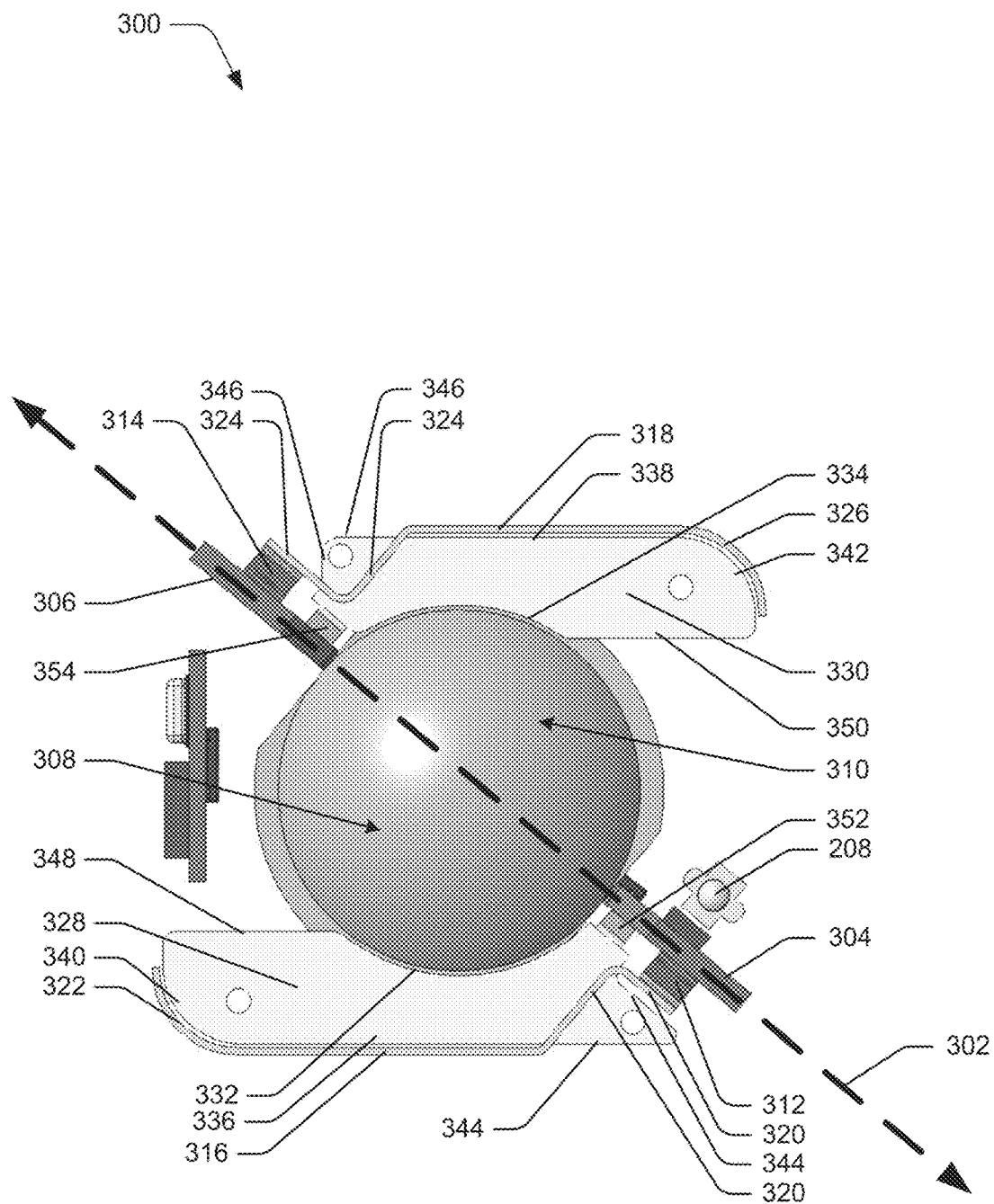
FIG. 3 is a top planar view of select device components of the device of FIG. 2B.

Referring to FIG. 3, there is shown a top planar view of select device components of a device 300. FIG. 3 presents a lateral axis 302 that is aligned with length and width of the circuit board 252 (see FIG. 2B, represented here by the lateral axis 302), parallel to the planar surfaces of the circuit board 252, and distinguishes the first side of the circuit board 252 from the second side of the circuit board 252. The circuit board 252 is represented by the first extension 304 and the second extension 306. The lateral axis 302 is also effective to distinguish a first side 308 of the sensor 254 from a second side 310 of the sensor 254 (see FIG. 2B, represented here, in part, by the first side 308 and the second side 310).

The first and second extensions 304, 306 of the circuit board 252 provide contact points 312, 314, respectively, for the first frontend antenna 316 and the second frontend antenna 318. The first frontend antenna 316 of the device 300 is positioned offset from the first side 308 of the sensor 254 and offset from the first side 308 of the circuit board 252 (represented by the lateral axis 302). Likewise, the second frontend antenna 318 of the device 300 is positioned offset from the second side 310 of the sensor 254 and offset from the second side 310 of the circuit board 252 (represented by the lateral axis 302). The offset of the second frontend antenna 318 from the second side 310 of the sensor 254 is substantially similar to the offset of the first frontend antenna 316 from the first side 308 of the sensor 254.

The first and second frontend antennas 316, 318 are similar in shape but extend structurally in opposing directions. For example, the first frontend antenna 316 has angular portions 320 near its contact point 312 to the circuit board 252, extends linearly through its mid-section, and has a broad curved end 322, and the second frontend antenna 318 has angular portions 324 near its contact point 314 to the circuit board 252, extends linearly through its mid-section, and has a broad curved end 326. For this example, as shown in FIG. 3, the first frontend antenna 316 has a contact point 312 near the right side of the figure and extends to the left, whereas the second frontend antenna 318 has a contact point 314 near the left side of the figure and extends to the right.

The outer perimeters of the first and second shields 328, 330 align with the shape of the first and second frontend antennas 316, 318 and the outer circumference of the first and second sides 308, 310 of the sensor. As explained above, the first side 308 of the sensor is substantially opposite the second side 310 of the sensor. The first shield 328 may have a first inner edge 332 adjacent to a first portion of an outer surface of the first side 308, and the second shield 330 may have a second inner edge 334 adjacent to a second portion of the outer surface of the second side 310. A substantial portion of the first frontend antenna 316 follows a first outer boundary 336 of the first shield 328 (and vice versa), and a substantial portion of the second frontend antenna 318 follows a second outer boundary 338 of the second shield 330 (and vice versa). For example, a smooth curved edge 340 of the first shield 328 is aligned with the broad curved end 322 of the first frontend antenna 316, and a smooth curved edge 342 of the second shield 330 is aligned with the broad curved end 326 of the second front end antenna 318. On the other hand, the first and second frontend antennas 316, 318 do not need to completely follow the first and second outer boundaries 336, 338 of the first and second shields 328, 330. For example, the angular portions 320, 324 of the first and second frontend antennas 316, 318 are not aligned with their corresponding sections 344, 346 of the first and second shields 328, 330, and certain inner edges 348, 350 of the first and second shields do not align with other portions of the outer surface of the first and second sides 308, 310 of the sensor. Each of the first and second shields 328, 330 includes a ground contact 352, 354, and are thus grounded to, the circuit board 252 during part, or all, of its operation. It is to be understood that the design of the outer perimeters of the first and second shields 328, 330 may vary depending upon performance requirements without departing from the spirit and scope of the disclosure in its broadest form.

Figure 4:
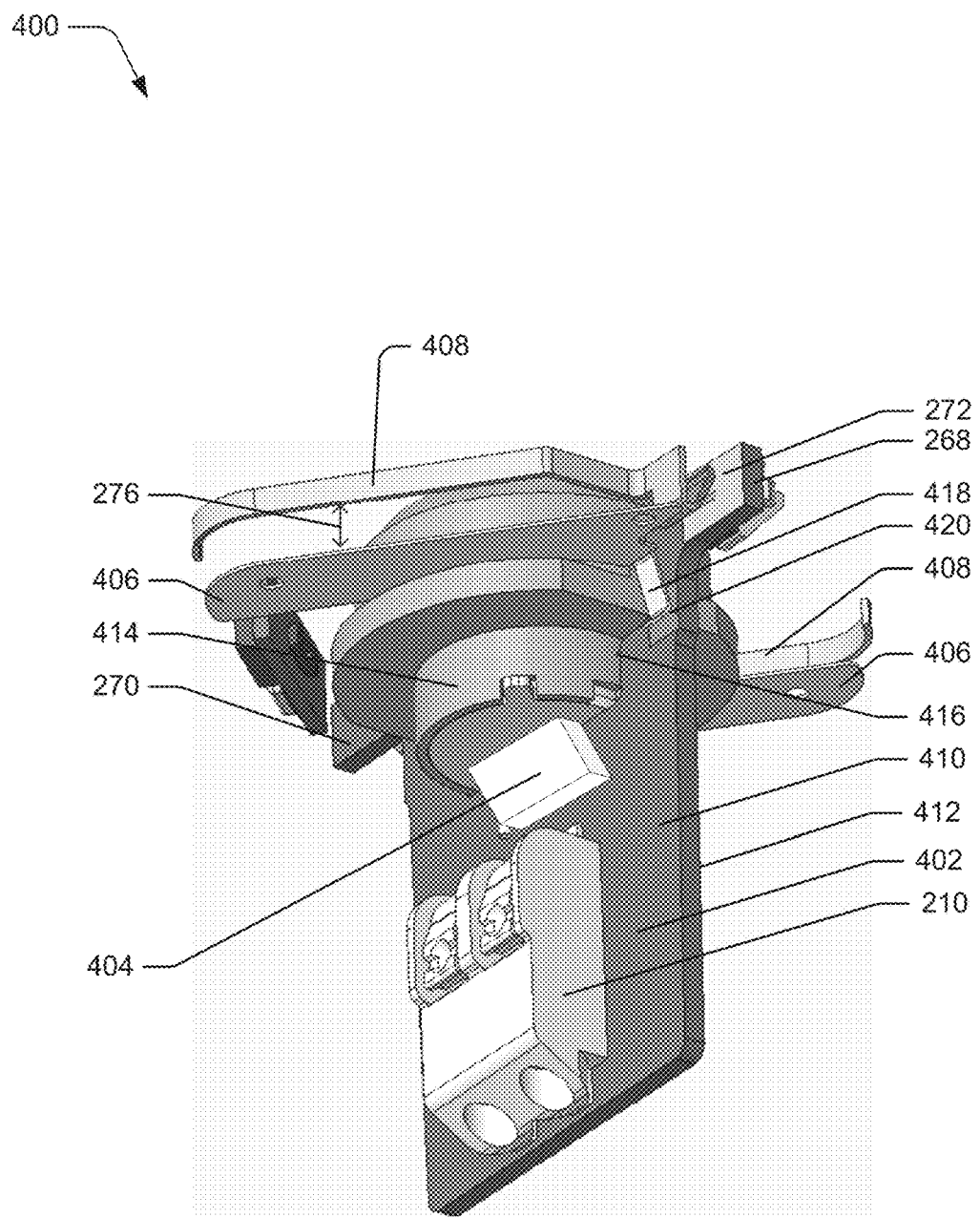
FIG. 4 is a lower perspective view of the select device components of the device of FIG. 2B.

Referring to FIG. 4, there is shown a lower perspective view of the select device components of a device 400. The device 400 comprises a circuit board 402, a first diversity antenna 404, a second diversity antenna 406, and one or more third antennas 408. For some embodiments, as illustrated by FIGS. 2B, 3, and 4, the second diversity antenna 406 may correspond to one of the first or second shields 260, 262, 328, 330, and the third antenna 408 may correspond to one of the first or second frontend antennas 256, 258, 316, 318. For example, a device for managing communications may operate the first and second frontend antennas 256, 258, 316, 318 and the first and second shields 260, 262, 328, 330. As another example, a device for switching communications may operate the first diversity antennas 404, the second diversity antenna 406, and the third antenna(s), in which the second diversity antenna switches between acting as an independent diversity antenna and acting as a shield for a frontend antenna.

The first and second diversity antennas 404, 406 and the third antenna 408 are each coupled to the circuit board 402, in which each antenna is focused on a particular direction and based on a particular wireless technology. The first and second diversity antennas 404, 406 are based on the same wireless technology but focused on different directions. Examples of wireless technologies includes, but are not limited to, Bluetooth (including BLE), Wi-Fi (including Wi-Fi Direct), Ultrawide Band, IEEE 802.15.4, Z-Wave, 6LoWPAN, Near-Field Communication, other types of electromagnetic radiation of a radio frequency wave, light-based communications (including infrared), acoustic communications, and any other type of peer-to-peer technology. For example, the first and second diversity antennas 404, 406 may switch back-and-forth between operating Ultrawide Band communications in different directions of focus, depending on whether the first diversity antenna 404 is operating, the second diversity antenna 406 is operating, or both. For some embodiments, the first diversity antenna 404 is focused on a first direction, the second diversity antenna 406 is focused on a second direction, and the first and second directions are substantially orthogonal. For some embodiments, the first direction is substantially parallel to one or both of first and second planar surfaces 410, 412 of the circuit board 402 and the second direction is substantially orthogonal to the planar surfaces 410, 412 of the circuit board 402.

The third antenna 408 is based on a wireless technology different from the wireless technologies of the first and second antennas 404, 406, regardless of the focal direction of the third antenna. Examples of wireless technologies includes, but are not limited to, Bluetooth (including BLE), Wi-Fi (including Wi-Fi Direct), Ultrawide Band, IEEE 802.15.4, Z-Wave, 6LoWPAN, Near-Field Communication, other types of electromagnetic radiation of a radio frequency wave, light-based communications (including infrared), acoustic communications, and any other type of peer-to-peer technology. For example, the first and second diversity antennas 404, 406 may operate based on Ultrawide Band communications whereas the third antenna 408 may operate based on BLE or IEEE 802.15.4 communications. As stated above, the second diversity antenna 406 may operate as a shield for the third antenna 408.

A sensor 414 is positioned at an edge of the circuit board 402 and extends laterally beyond one or both planar surfaces 410, 412 of the circuit board. The circuit board 402 includes a cutout portion 416 at the edge to receive an outer profile of the sensor 414. The circuit board 402 includes a circuit configured to switch operation of the first wireless technology between the first diversity antenna 404 and the second diversity antenna 406 based on a performance of the first and second diversity antennas. The circuit may also be configured to switch the second diversity antenna 406 between an active operation states and a passive ground state. The circuit maintains the second diversity antenna 406 in the passive ground state when operating the third antenna 408, in which the second diversity antenna acts as a shield to direct the third antenna 408 toward the field of view. The circuit operates the second diversity antenna 406 based on the first wireless technology when the second diversity antenna 406 is in the active state.

As explained above, the circuit of the circuit board 402 is configured to switch the second diversity antenna 406 between focusing on a second direction different from a first direction of the first diversity antenna 404 and operating as the shield for the third antenna 408. For some embodiments, the first direction may be substantially parallel to at least one planar surface 410, 412 of the circuit board 402 and the second direction may be substantially orthogonal to the planar surface(s) of the circuit board. For some embodiments, like the one illustrated by FIG. 4, the first diversity antenna 404 may be located at the circuit board 402 whereas the second diversity antenna 406 may be offset from the circuit board, in which the second diversity antenna may include an end tab 418 that couples to the circuit board at a contact point 420. For example, the first diversity antenna 404 may be mounted to one or both sides of the circuit board 402 or be electrical traces on or within the circuit board 402. The third antenna or antennas 408 are coupled to the circuit board 402 and may be focused on a third direction. The third direction may be similar to the first direction or the second direction, or the third direction may be independent of the first and second directions.

The circuit board 402, or more particularly a circuit of the circuit board, may switch operation of a first wireless technology between the first diversity antenna 404 and the second diversity antenna 406 based on the performance of the first and second diversity antennas. For example, the circuit of the circuit board 402 may switch operation based on a packet error rate associated with the performance of the first and second diversity antennas 404, 406.

Figure 5:
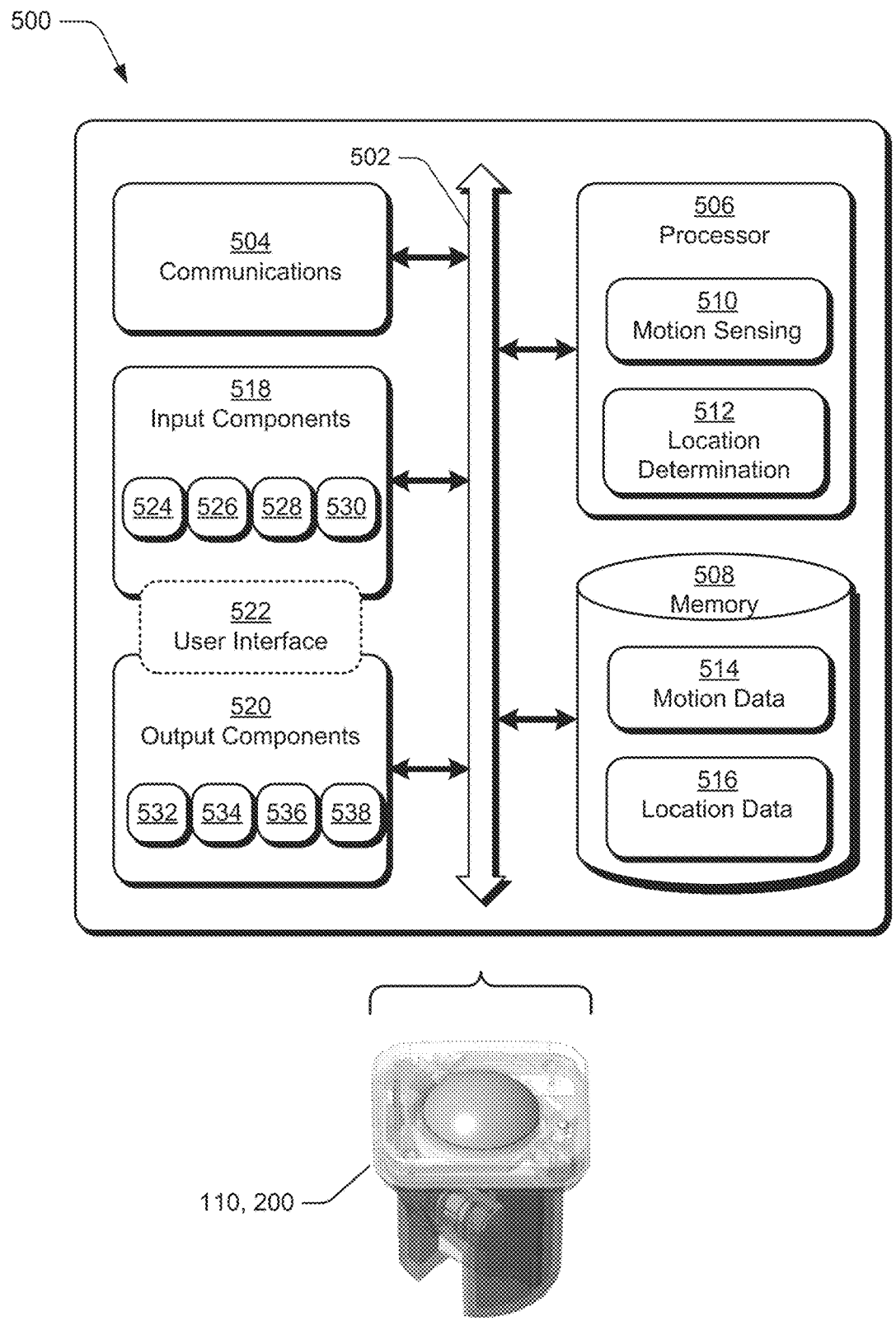
FIG. 5 is a block diagram of the operational components of the device of FIG. 2A.

FIG. 5 represents example device components 500 of the device 110, 200 in accordance with the communication management and/or switching approach for device operation. The device components 500 of the device 110, 200 comprise a communication bus 502 for interconnecting the other device components directly or indirectly, one or more communication components 504 communicating other entities via a wired or wireless network, one or more processors 506, and one or more memory components 508. The communication component 504 may utilize wireless technology for communication, such as, but are not limited to, Bluetooth (including BLE), Wi-Fi (including Wi-Fi Direct), Ultrawide Band, Zigbee, Z-Wave, 6LoWPAN, Near-Field Communication, other types of electromagnetic radiation of a radio frequency wave, light-based communications (including infrared), acoustic communications, and any other type of peer-to-peer technology.

The one or more processors 506 may execute code and process data received at other components of the device components 500, such as information received at the communication component 504 or stored at the memory component 508. The code associated with the building automation system and stored by the memory component 508 may include, but is not limited to, operating systems, applications, modules, drivers, and the like. An operating system includes executable code that controls basic functions of the device 110, 200, such as interactions among the various components of the device components 500, communication with external devices via the communication component 504, and storage and retrieval of code and data to and from the memory component 508. Each application includes executable code to provide specific functionality for the processor 506 and/or remaining components of the device 110, 200. Examples of applications executable by the processor 506 include, but are not limited to, a motion sensing module 510 configured to determine occupancy of people or assets within a particular area based on detected motion and a location determination module 512 configured to determine a location of people or assets within a particular area based on detected communication signals. Data is information that may be referenced and/or manipulated by an operating system or application for performing functions of the device 110, 200. Examples of data associated with the device 110, 200 and stored by the memory component 508 may include, but are not limited to, motion data 514 associated objects moving in proximity to a motion sensor and location data 516 associated with objects transmitting communication information.

The device components 500 of each device 110, 200 may further comprise one or more input components 518 and/or one or more output components 520. The input and output components 518, 520 of the device components 500 may comprise a user interface 522 for interaction with a user of the device 110, 200. The user interface 522 may include a combination of hardware and software to provide a user with a desired user experience. For example, the user interface 522 may include one or more input components to allow the user to enter information and one or more output components to provide information to the user. The input and output components 518, 520 of the device components 500 may include one or more visual, audio, mechanical, and/or other components. Examples of the input components 518 may include, but is not limited to, an infrared sensor 524 (such as a passive infrared sensor), ultrasonic sensor 526, microwave sensor 528, tomographic sensor 530, and a combination of sensing technologies. Examples of the output components 520 may include, but is not limited to, displays 532, visual indicators 534, audio speakers 536, mechanical actuators 538, and a combination of output technologies.

It is to be understood that FIG. 5 is provided for illustrative purposes only to represent examples of the device components 500 of a device 110, 200 and is not intended to be a complete diagram of the various components that may be utilized by the device. Therefore, the device 110, 200 may include various other components not shown in FIG. 5, may include a combination of two or more components, or a division of a particular component into two or more separate components, and still be within the scope of the present invention.

Figure 6:
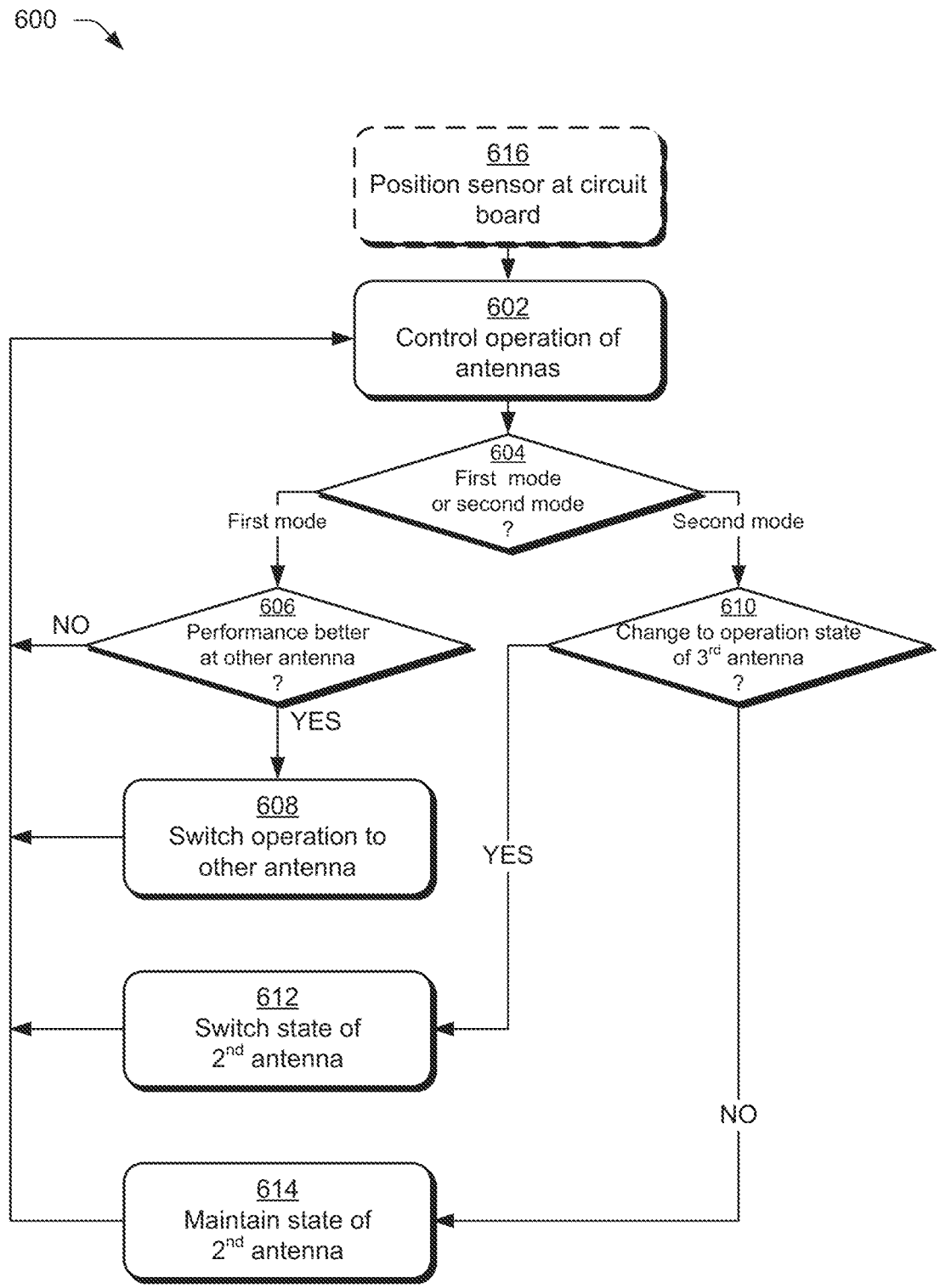
FIG. 6 is a flow diagram of an example operation of the device of FIG. 2A.

Referring to FIG. 6, there is shown a flow diagram of an example operation 600 of the device 110, 200. The circuit board 402, or more particularly a circuit of the circuit board, may control 602 operation of a first antenna 404, a second antenna 406, and a third antenna 408 of the device 110, 200. Operation of the antennas 404, 406, 408 include transmitting and/or receiving wireless communications in designated directions based on one or more wireless technologies. For example, the first antenna 404 may focused on a first direction and based on a first wireless technology, and the second antenna 406 is focused on a second direction and based on the first wireless technology, in which the second direction being different from the first direction. Also, the third antenna 408 may focused on a third direction and based on a second wireless technology, in which the second wireless technology being different from the first wireless technology. For some embodiments, the first and second directions may be substantially orthogonal. For some embodiments, the first direction may substantially parallel to one or both planar surfaces 410, 412 of the circuit board 402 and the second direction may be substantially orthogonal to the planar surface(s) of the circuit board.

The circuit of the circuit board 402 may determine 604 whether to operate in a first mode or a second mode of the device 110, 200. For the first mode, the circuit 402 may manage the interaction or cooperation of the first diversity antenna 404 and the second diversity antenna 406. In particular, the circuit may determine 606 whether the performance of another antenna is, or would be, better than the performance of a currently operating antenna. If the performance of another antenna (such as the second diversity antenna 406) would be better than the antenna currently operating (such as the first diversity antenna 404), then the circuit may switch 608 operation of the device 110, 200 to the other antenna. Thus, the circuit may switch 608 operation of a first wireless technology between the first diversity antenna 404 to the second diversity antenna 406 based on a performance of the first and second diversity antennas. For example, the operation of the first wireless technology may switch 608 between the first and second diversity antennas 404, 406 based on a packet error rate associated with the performance of the first and second diversity antennas. In response to switching 608 operation, the circuit may return to planned operations 602 of operating the device 110, 200. On the other hand, if the performance of another antenna would not be better than the antenna currently operating, then the circuit would continue 602 with the currently operating antenna for operating the device 110, 200.

For the second mode, the circuit 402 may manage 610 operation of the second diversity antenna 406 (i.e., second shield 260, 262, 328, 330), based on whether or not operation state of the third antenna 408 (i.e., first and second frontend antennas 256, 258, 316, 318) changes. If the operation state of the third antenna 408 changes, then the circuit may switch 612 a state of the second diversity antenna 406 between an active operation state and a passive ground state based on an operation state of the third antenna. In particular, the circuit may be configured to switch 612 the second diversity antenna 406 between focusing on the second direction and operating as a shield for the third antenna 408. In response to switching 612 operation, the circuit may return to planned operations 602 of operating the device 110, 200. If the operation state of the third antenna 408 does not change, then the circuit may maintain 614 the state of the second diversity antenna 406 in the passive ground state when operating the third antenna and return to planned operations 602 of operating the device 110, 200.

For some embodiments, the sensor 414 may be assembled to the circuit board 402 before controlling 602 operation of a first antenna 404, a second antenna 406, and a third antenna 408 of the device 110, 200. In particular, the sensor 414 may be positioned 616 at an edge of the circuit board 402 so that the sensor extends laterally beyond one or both planar surfaces 410, 412 of the circuit board. The circuit board 402 include a cutout portion 416 at the edge to receive an outer profile of the sensor 414 so that the sensor may be positioned to the circuit board.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A device for managing communications comprising:
   a sensor having a field of view, the sensor including a first side and a second side, the second side being substantially opposite the first side;
   a first antenna positioned offset from the first side of the sensor;
   a second antenna positioned offset from the second side of the sensor;
   a first shield positioned adjacent to the first side of the sensor and a first distance from the first antenna, the first shield directing the first antenna toward the field of view; and
   a second shield positioned adjacent to the second side of the sensor and a second distance from the second antenna, the second shield directing the second antenna toward the field of view.

2. The device as described in claim 1, wherein the offset of the second antenna from the second side of the sensor is substantially similar to the offset of the first antenna from the first side of the sensor.

3. The device as described in claim 1, wherein the first and second distances are substantially similar.

4. The device as described in claim 3, wherein the first and second shields are located within a common two-dimensional plane.

5. The device as described in claim 1, the first and second antennas are similar in shape but extend structurally in opposing directions.

6. The device as described in claim 1, wherein the first shield has a first inner edge adjacent to a first portion of an outer surface of the sensor and the second shield has a second inner edge adjacent to a second portion of the outer surface of the sensor, the second portion being substantially opposite to the first portion.

7. The device as described in claim 1, wherein a substantial portion of the first antenna follows an outer boundary of the first shield and a substantial portion of the second antenna follows an outer boundary of the second shield.

8. The device as described in claim 1, further comprising a circuit coupled to the sensor, the first antenna, and the second antenna, and a ground coupled to the first and second shields.

9. The device as described in claim 1, wherein the sensor is a motion sensor.

10. The device as described in claim 1, wherein the first and second antennas operate for different wireless technologies.

11. A device for managing communications comprising:
    a circuit board having a first side and a second side, the second side being substantially opposite the first side;
    a sensor positioned adjacent to the circuit board, the sensor including a body supported by the circuit board and a front end extending from the body;
    a first antenna coupled to the first side of the circuit board and positioned proximal to the front end of the sensor and offset from the first side of the circuit board;
    a second antenna coupled to the second side of the circuit board and positioned proximal to the front end of the sensor and offset from the second side of the circuit board;
    a first shield positioned adjacent to an outer surface of the sensor and a first distance from the first antenna; and
    a second shield positioned adjacent to the outer surface of the sensor and a second distance from the second antenna.

12. The device as described in claim 11, wherein the offset of the second antenna from the second side of the circuit board is substantially similar to the offset of the first antenna from the first side of the circuit board.

13. The device as described in claim 11, wherein the first and second distances are substantially similar.

14. The device as described in claim 13, wherein the first and second shields are located within a common two-dimensional plane.

15. The device as described in claim 11, wherein the first and second antennas are similar in shape but extend structurally in opposing directions.

16. The device as described in claim 11, wherein the first shield has a first inner edge adjacent to a first portion of the outer surface of the sensor and the second shield has a second inner edge adjacent to a second portion of the outer surface of the sensor, the second portion being substantially opposite to the first portion.

17. The device as described in claim 11, wherein a substantial portion of the first antenna follows an outer boundary of the first shield and a substantial portion of the second antenna follows an outer boundary of the second shield.

18. The device as described in claim 11, wherein a ground is coupled to the first and second shields.

19. The device as described in claim 11, wherein the sensor is mounted to an edge of the circuit board and extends symmetrically beyond the first and second sides of the circuit board.

20. The device as described in claim 11, wherein the front end of the sensor includes a sensor lens directed away from the circuit board in a direction parallel to the first and second sides of the circuit board.

\* \* \* \* \*